United States Patent
Hosoe et al.

[11] 3,812,373
[45] May 21, 1974

[54] METHOD AND APPARATUS FOR IDENTIFYING THE PERIODICITY OF SURFACE DEFECTS OF STRIP MATERIALS

[75] Inventors: Toshiaki Hosoe; Yuji Okami; Katsumi Michishita; Shuzo Fukuda, all of Yokohama, Japan

[73] Assignee: Nippon Kokan Kabushiki Kaisha, Tokyo, Japan

[22] Filed: June 13, 1973

[21] Appl. No.: 369,742

[30] Foreign Application Priority Data
July 31, 1972 Japan.................. 47-76008

[52] U.S. Cl.............. 250/562, 235/92 V, 356/200
[51] Int. Cl. ... G01n 21/16, G01n 21/30, G06f 7/38
[58] Field of Search.............. 250/562; 356/200; 235/92 V

[56] References Cited
UNITED STATES PATENTS
3,729,619  4/1973  Laycak et al. ............... 250/562

Primary Examiner—James W. Lawrence
Assistant Examiner—T. N. Grigsby
Attorney, Agent, or Firm—Flynn & Frishauf

[57] ABSTRACT

There are provided in optical defect detector to produce pulse signals representing the surface defects and a pulse generator driven by a continuously moving strip material for producing shift pulse signals synchronized with the moving speed of the strip material. The pulse signals and the shift pulse signals are applied to a shift register including a plurality of register circuits. An AND gate circuit is used to provide a logical product of the predetermined ones of the register circuits which are spaced apart a predetermined spacing and when the logical product is equal to a predetermined value, a binary "1" for example, the periodicity of the surface defects is identified.

13 Claims, 4 Drawing Figures

METHOD AND APPARATUS FOR IDENTIFYING THE PERIODICITY OF SURFACE DEFECTS OF STRIP MATERIALS

BACKGROUND OF THE INVENTION

This invention relates to a method and apparatus for identifying the periodicity of surface defects, and more particularly to a method and apparatus for identifying the surface defects having a periodicity in the case when the surface defects of a moving strip material such as a steel strip are detected by a detecting device including an optical system.

Surface defects in the form of depressions, scratches and irregular colours are often formed on the surface of rolled steel strips. It has been the practice to detect such surface defects with the eyes of an operator for the purpose of classifying the steel strips according to the configuration and periodicity of the surface defects.

Various types of optical means for detecting the surface defects have been proposed but each of them can detect only the magnitude of the surface defects so that the field of application of the information provided by such prior art detecting apparatus is limited. There was no reliable method and apparatus for identifying the type of the surface defects according to the surface configuration thereof.

It is important to identify the configuration and periodicity of the surface defects in order to determine that at which portion or machine of the strip manufacture line are the surface defects formed. Since periodically occuring surface defects are generally formed during the rolling process of the strip it is important to determine the periodicity of the surface defects in order to accurately determine the portion or machine of the line at which such defects are formed.

SUMMARY OF THE INVENTION

Accordingly, it is an object of this invention to provide a novel method and apparatus for detecting at high accuracies the surface defects having a predetermined periodicity thereby locating the portion or machine which causes such periodic surface defects so as to enable to eliminate such surface defects as fast as possible.

A further object of this invention is to provide a novel method and apparatus for identifying the periodicity of the surface defects of a continuously moving strip material, which can be readily incorporated into existing optical surface detector thereby automating the detecting operation thereof so as to save the labour and improve the quality of the product.

Another object of this invention is to provide an improved surface defect detector which can detect at high accuracies extremely small surface defects which are difficult to be detected by the prior art surface defect detector, thereby improving the quality of the product such as rolled steel strips.

According to one aspect of this invention, there is provided a method of identifying the periodicity of surface defects comprising the steps of detecting the surface defects of a continuously moving strip material by using a defect detector including an optical system, thereby producing pulse signals representing the surface defects of the strip material, applying the pulse signals upon the input of a shift register including a plurality of register circuits connected, applying to the shift register shift pulse signals synchronized with the moving speed of the strip material thereby sequentially shifting respective register circuits, deriving a logical product of the outputs from predetermined ones of the register circuits which are spaced apart a predetermined spacing, and determining the pulse signals having a predetermined periodicity among the input pulses applied to the shift register when said logical product has a predetermined value.

According to another aspect of this invention, there is provided apparatus for identifying the periodicity of the surface defects of a continuously moving strip material comprising an optical defect detector for producing pulse signals representing the surface defects, a shift register including a plurality of register circuits connected, a pulse generator for producing shift pulse signals synchronized with the moving speed of the strip material, means to apply the pulse signals generated by the defect detector and the shift pulse signals generated by the pulse generator upon the shift register, and means for deriving out a logical product of the outputs of predetermined ones of the register circuits which are spaced apart a predetermined spacing whereby when the logical product has a predetermined value the periodicity of the surface defects is identified.

BRIEF DESCRIPTION OF THE DRAWINGS

Further objects and advantages of the invention can be more fully understood from the following detailed description taken in conjunction with the accompanying drawings, in which.

DESCRIPTION OF THE PREFERRED EMBODIMENTS

Figure 1:
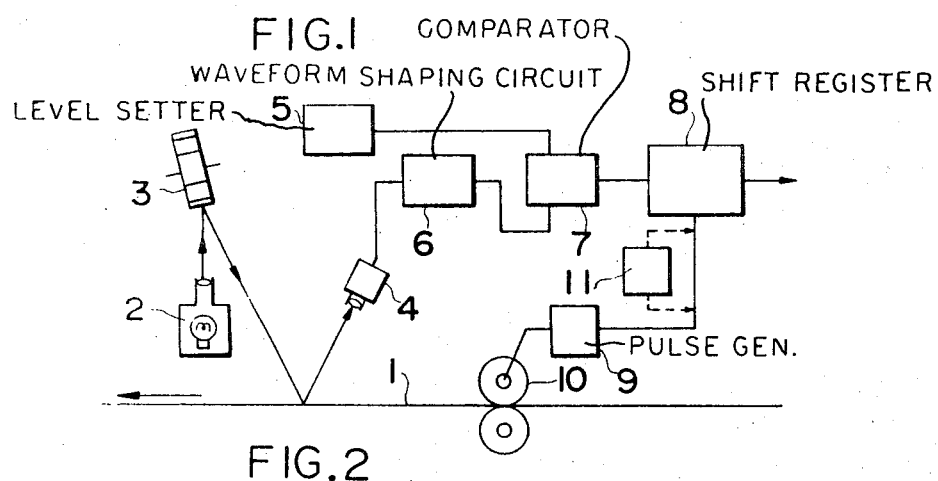
FIG. 1 shows a block diagram of apparatus for detecting surface defects incorporating novel means for identifying the periodicity of the defects.

Referring now to FIG. 1 of the accompanying drawing, an object to be examined 1 is shown as a metal strip continuously passing through a rolling mill line in the direction of an arrow. The light projected by a source of light 2 is reflected by a rotary mirror 3 to laterally scan the surface of the strip 1. The light reflected by the surface of the strip 1 is received by a light receiver 4 to be converted into an electrical signal corresponding to the intensity of the reflected light, that is the presence or absence of the surface defect. The electric signal is processed in a manner well known in the art by an amplifying and waveform shaping circuit 6, the waveform of the output thereof being shown by FIG. 4a. As can be noted from FIG. 4a the output contains defect signals and noises. A dotted line depicted therein represents a reference level which is set by a level setter 5. The output from the waveform shaping circuit 6 is compared with the reference level in a comparator 7, and only the portion of the output exceeding the reference level is taken out of the comparator 7 as shown by FIG. 4b.

The component parts described above are well known, so that the invention can be applied to existing optical surface defect detecting apparatus.

Since the pulsed output from the comparator 7 represents the surface defects of the strip 1 it is possible to apply this output to a display device to display the defects, but such output contains all defects caused by many types of the cause.

According to this invention, for the purpose of identifying the periodicity of the output from the comparator 7, a shift register 8 is connected to the output of the comparator 7 and a pulse generator 9 is connected to one of the rollers 10 arranged to be driven by the moving strip 1 so as to supply to the shift register 8 a shift pulse (see FIG. 4c) synchronized with the travelling speed of the strip thereby shifting respective register circuits comprising the shift register 8 in a manner to be described later in detail. The outputs from the register circuits which are spaced apart a predetermined spacing are applied to an AND gate circuit and the logical product of these outputs is used to detect particular pulses having a periodicity out of the output pulses from the comparator 7.

Figure 2:
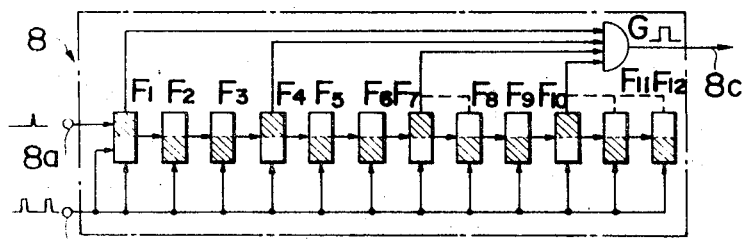
FIG. 2 is a block diagram of a shift register consisting of flip-flop circuits, which is a preferred example of the novel means for identifying the periodicity of the surface defects.

As diagrammatically shown in FIG. 2, the shift register 8 comprises a plurality of register circuits $F_1$ through $F_{12}$, preferably in the form of bistable circuits, such as flip-flop circuits which are connected, and an AND gate circuit G. One input terminal 8a is supplied with the output pulse from comparator 7 and the other input terminal 8b is supplied with the shift pulses from pulse generator 9.

The first register circuit or flip-flop circuit $F_1$ of the shift register 8 is set by the output pulse from comparator 7 or the defect signal representing the surface defect of the strip 1, and reset by the shift pulse to shift its information content to the succeeding register circuit $F_2$. The second and following register circuits $F_2$, $F_3$ ... $F_{12}$ are constructed such that each one of them is set by the output from a preceding register circuit for receiving the information content thereof, and reset each time it receives the shift pulse for shifting its information content to the succeeding register circuit.

Figure 4:
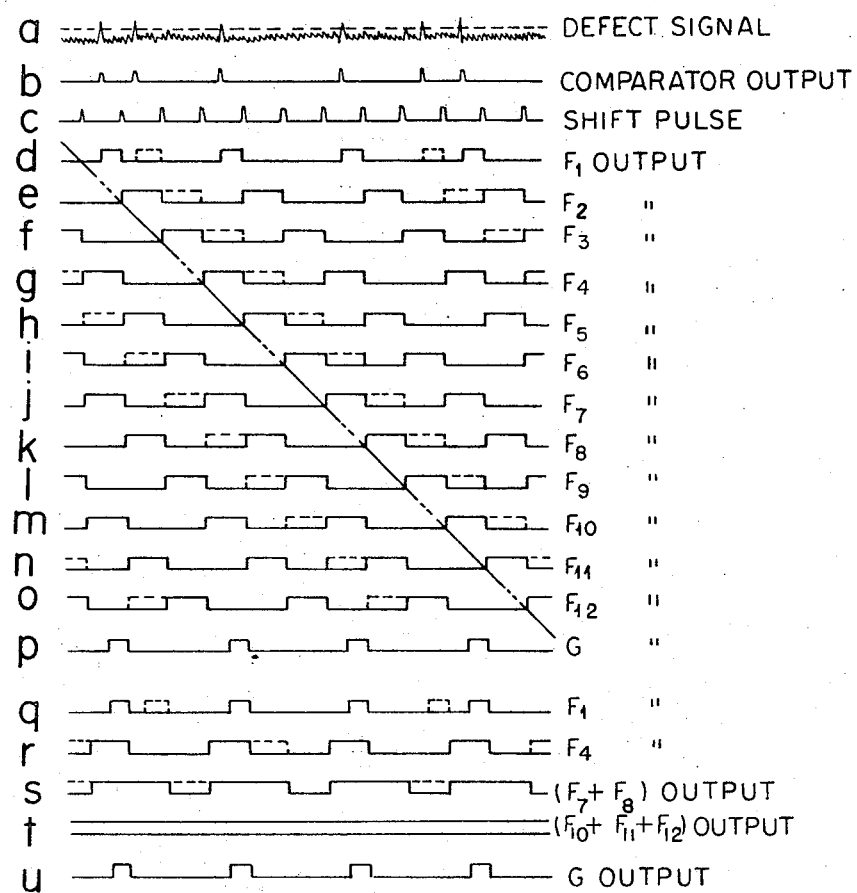
FIG. 4 shows the waveforms of pulses at various portions of the shift register acting as a periodicity identifying circuit.

Furthermore, the shift register shown in FIG. 2 is constructed such that the outputs from register circuits $F_1$, $F_4$, $F_7$ and $F_{10}$, which are spaced apart a predetermined spacing, are applied to the inputs of the AND gate circuit G and that when the logical product of these outputs is "1" it is identified that the input pulse signals from comparator 7 has a periodicity thereby producing an output terminal 8c of the AND gate circuit G. The waveforms of the output pulses from respective register circuits are shown by solid line curves shown in FIG. 4. The register circuits $F_1$, $F_4$, $F_7$ and $F_{10}$ with their outputs connected to the AND gate circuit G are maintained in the set state during an interval between the application of the periodic impulse from comparator 7 and the application of the next shift pulse so that the output from the AND gate circuit G is maintained at "1" only during this interval. Dotted line pulse waveforms shown in FIG. 4 show defect signals lacking the periodicity and output waveforms of respective register circuits caused by such defect signals. With this circuit arrangement, the shift register 8 acting as a periodicity identifying circuit detects the fact that a surface defect having a period equal to three times of the spacing between shift pulses has occured four times consecutively over a corresponding length of the strip 1. The period of the reccurrence of the surface defects and the number of the consecutive surface defects which is a measure for determining the presence of the periodic surface defects can be varied as desired by varying the number of the shift pulses per unit length of the strip 1 and by varying the connection between respective register circuits and the AND gate circuit.

The method of this invention is characterized in that it is possible to set the reference level provided by the level setter 5 at a lower level than the detection level of the conventional surface defect detector because the identification of the periodic defects is made for the defects having a predetermined period. More particularly, when the reference level set by the level setter 5 shown in FIG. 1 is lowered, small defects will also be detected. However it becomes impossible to discriminate such small defects from noise. However according to the method and apparatus of this invention, since the shift register 8 acting as the periodicity identifying circuit detects only the defect signals having a predetermined period the possibility of the erroneous operation caused by the irregularly varying noise level can be substantially eliminated. This is extremely advantageous because the periodic surface defects of a roller steel strip are caused by the surface defects of the mill rolls and are very small so that the defect signals are also very small.

When the reference level is set too lower by the level setter 5, or when the noise level is raised as a whole, there is established such condition that all register circuits $F_1$ through $F_{10}$ in shift register 8 shown in FIG. 2 provide outputs indicating the presence of defects, that is, all of these register circuits are maintained similarly in their set states. This results in that said condition gives an erroneous signal which may be accepted as the presence of the periodic defects caused by the corelation between $F_1$, $F_4$, $F_7$ and $F_{10}$ and the gate G. It is therefore one of the characteristics of the present invention that the register circuit is constructed so as not to give the signal indicating the presence of the periodic defects in such condition that all of the register circuits $F_1$ through $F_{10}$ provide outputs indicating the presence of defects. This can be accomplished by taking out the output of the shift register 8 through an AND gate circuit which is controlled by the outputs of all register circuits. (not shown in FIG. 2).

As above described, the period of the recurrent surface defects detectably by the method and apparatus of this invertion can be determined dependent upon the connection between respective register circuit and the AND gate circuit and the number of shift pulses per unit length of the material to be examined, where the period to be detected is unknown, the number of shift pulses per unit length of the material is varied.

Figure 3:
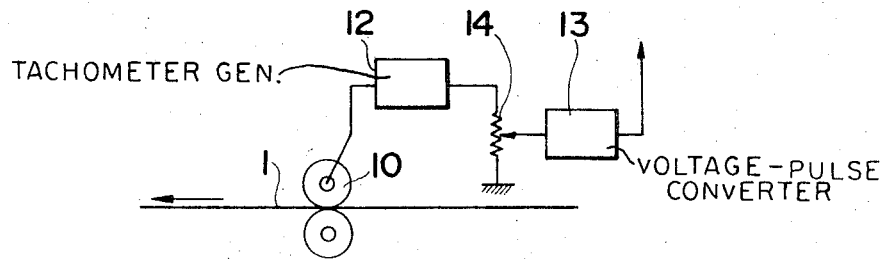
FIG. 3 is a block diagram showing a shift pulse generating circuit wherein shift pulses are generated by a tachometer generator and a voltage-pulse converter.

This can be accomplished by connecting a frequency divider 11 between the shift pulse generator 9 and the shift register 8, as shown in FIG. 1 or by connecting a potentiometer 14 between a tachometer generator 12 driven by one roller 10 and a voltage-pulse converter 13 connected to shift register 8, as shown in FIG. 3.

The digitalized error in the later stages of the shift register 8 increases in proportion to the number of the register circuits. However, such error can be eliminated by deriving a logical sum (in the form of continuous bits) of the outputs of equally spaced apart register circuits in a predetermined region in the later stages of the shift register 8 and by detecting periodic pulse signals among input signals by utilizing the logical product of all outputs (including said logical sum) of all equally spaced apart register circuits. One example of such connection is shown by dotted lines in FIG. 2. The logical sum of the outputs of register circuits $F_7$ and $F_8$ and that of the outputs of the register circuits $F_{10}$, $F_{11}$ and $F_{12}$ which are located in the later stages of the shift register 8 are derived out as continuous bits, and these logical sums are applied to the inputs of the AND gate circuit G together with the outputs from register circuits $F_1$ and $F_4$ which are spaced apart a predetermined spacing so as to cause the AND gate circuit to produce an output only when the logical product of all of said outputs is equal to "1". The waveforms of the output pulses of respective elements which are connected as above described are shown by FIG. 4q through FIG. 4u. The dotted line pulse waveforms shown in FIG. 4q through FIG. 4u show the pulses caused by defect signals lacking periodicity.

It should be understood that the invention is by no means limited to the specific embodiments described above and that the invention can be applied to various types of non-distractive examining or testing apparatus for identifying periodic defects.

As above described according to this invention there are provided a method and apparatus for detecting and identifying the periodicity of surface defects of an continuously moving object such as a rolled steel strip so that it is possible to quickly locate a portion or machine in the production line which causes such surface defects. Moreover, as it is possible to detect extremely small periodic defects which could not been detected by the conventional defect detector without being affected by noise whereby it is possible to increase the efficiency of the detecting device, to save the labour and to improve the quality of the product.

What is claimed is:

1. A method of identifying the periodicity of surface defects, comprising the steps of detecting the surface defects of a continuously moving strip material by using a defect detector including an optical system, thereby producing pulse signals representing the surface defects of said strip material, applying said pulse signals upon the input of a shift register including a plurality of register circuits connected, applying to said shift register shift pulse signals synchronized with the moving speed of said strip material thereby sequentially shifting respective register circuits, deriving a logical product of the outputs from predetermined ones of said register circuits which are spaced apart a predetermined spacing, and determining particular pulse signals having a predetermined periodicity among said pulse signals applied to said shift register when said logical product has a predetermined value.

2. The method according to claim 1 wherein the pulse signals having said periodicity are identified when said logical product of the outputs from said predetermined ones of said register circuits which are spaced apart a predetermined spacing is equal to a predetermined value and when all of said register circuits do not produce outputs of the same state.

3. The method according to claim 1 wherein the frequency of said shift pulse signal is varied so as to vary the number of said shift pulse signals per unit length of said material.

4. Apparatus for identifying the periodicity of the surface defects of a continuously moving strip material, said apparatus comprising an optical defect detector for producing pulse signals representing said surface defects, a shift register including a plurality of register circuits connected, a pulse generator for producing shift pulse signals synchronized with the moving speed of said strip material, means to apply the pulse signals generated by said defect detector and the shift pulse signals generated by said pulse generator upon said shift register, and means for deriving out a logical product of the outputs of predetermined ones of said register circuits which are spaced apart a predetermined spacing, whereby when said logical product has a predetermined value the periodicity of said surface defects is identified.

5. The apparatus according to claim 4 which further includes a comparator connected between said defect detector and said shift register for comparing said pulse signals produced by said defect detector with a predetermined reference level so as to apply to said shift register only pulse signals larger than said reference level.

6. The apparatus according to claim 4 wherein said pulse generator is driven by said continuously moving strip material.

7. The apparatus according to claim 4 which further comprises a frequency divider connected between said pulse generator and said shift register.

8. The apparatus according to claim 4 wherein said pulse generator comprises a tachometer generator driven by said continuously moving strip material, and a voltage-pulse converter connected between said tachometer generator and said shift register.

9. The apparatus according to claim 8 wherein a voltage divider is connected between said tachometer generator and said voltage-pulse converter.

10. The apparatus according to claim 4 wherein said means for deriving out the logical product is an AND gate circuit and the outputs of predetermined ones of said register circuits which are spaced apart a predetermined spacing are applied to the inputs of said AND gate circuits.

11. The apparatus according to claim 10 wherein the outputs of the register circuits following said predetermined ones of said register circuits which are located in the later stages of said shift register are also applied to the input of said AND gate circuit.

12. The apparatus according to claim 4 wherein each of said register circuit comprises a bistable circuit which is connected to be set by the pulse signal representing the surface defect and reset by said shift pulse signal so as to shift its information content to the succeeding shift register.

13. The apparatus according to claim 4 wherein said pulse signals produced by said defect detector also contains noise component and the output of said shift register is taken out through an AND gate circuit which is controlled by the outputs of all of said register circuits.

* * * * *